July 7, 1959

C. P. LILJENGREN

2,893,476

SEAT CONSTRUCTION

Filed Sept. 10, 1956

INVENTOR.
CURTIS P. LILJENGREN

BY *Albert N. Kirchner*

ATTORNEY

July 7, 1959     C. P. LILJENGREN     2,893,476
SEAT CONSTRUCTION Filed Sept. 10, 1956     6 Sheets-Sheet 3

INVENTOR.
CURTIS P. LILJENGREN
BY *Albert H. Kirchner*
ATTORNEY

July 7, 1959  C. P. LILJENGREN  2,893,476
SEAT CONSTRUCTION
Filed Sept. 10, 1956  6 Sheets-Sheet 6

INVENTOR.
CURTIS P. LILJENGREN
BY
ATTORNEY

United States Patent Office 2,893,476
Patented July 7, 1959

2,893,476

SEAT CONSTRUCTION

Curtis P. Liljengren, Miami, Fla.; Shirley S. Liljengren, sole legatee of said Curtis P. Liljengren, deceased Application September 10, 1956, Serial No. 609,015

18 Claims. (Cl. 155—179)

The present invention relates to resilient seat constructions and more particularly to flexible body-conforming contour elements therefor and means for providing spring suspensions for the same.

A principal object of the invention is to enhance the comfort of seat back and/or seat bottom cushion elements formed of assemblies of "flexible contour" strip means by providing such elements with a novel type of spring suspension which will maintain in the assemblies a desirable body-fitting contour while providing the outer ends of the assemblies, i.e., the front end of the seat bottom and the upper end of the seat back, with freedom of the individual strips or strip means to move independently of each other in a direction substantially normal to the general plane of the assembly, i.e., up and down movement for the front end of the bottom cushion and in and out, or forward and backward, movement for the upper end of the back cushion.

Other objects are concerned with providing a seat construction having the foregoing and other advantages which is specially adapted for use as a vehicle seat, particularly in automotive vehicles, where the new construction exhibits improved riding qualities and shock absorbing features, including superior damping characteristics.

Another object is to provide a resilient cushion member preformed to ideal body-conforming contour with suspension means that will yield in response to variations in load without disturbing the contour.

In this connection an important object is to provide a cushion unit capable of completely absorbing minor road shocks and reducing the effect of major road shocks to minor deflections, so that seat bottoms and backs embodying the invention can be made thinner than prior art bottoms and backs, thus providing more usable space beneath the seat and behind it.

A related object is to provide a mechanical structure having the foregoing and other advantages which is adapted for mass production at relatively low cost by reason of the relatively small number of parts required, as well as because of the simplicity of the elements and the ease of their assembly.

A further related object is to provide a seat construction for automotive vehicles, as well as for chairs of the movable furniture type, allowing great freedom of styling by reason of its elimination of dependence on a number of primary seating elements, particularly in respect of supporting structure.

Other objects and advantages will be evident to those skilled in the art from the following description considered in conjunction with the accompanying drawings and the appended claims.

In the drawings, which illustrate certain presently preferred forms of embodiment of the invention.

These showings are made merely for the purpose of exemplifying the invention in certain preferred forms of embodiment and not for the purpose of introducing any limitations beyond the scope of the appended claims.

Referring first to Figs. 1–5, 8 and 9, the construction there shown comprises a seat of automotive type having a bottom 1 and a back 2 secured respectively to the generally horizontal portion 3 and the generally upright portion 4 of a support 5. As shown in these figures the support 5 may be constructed of thin walled tubing of rectangular cross section filled with a foam-in-place solidified plastic resin 6 to provide a lightweight rigid framing structure as disclosed in my copending application Serial No. 517,167, filed June 22, 1955 and now Patent No. 2,833,339. As will be hereinafter pointed out, however, the support may be formed otherwise, as shown for example in Figs. 6, 7 and 16, as long as the support contains a substantially horizontal portion like that shown at 7 in Figs. 6, 7 and 16 if the seat bottom is to be constructed in accordance with the principles of the invention, and as long as the support contains a substantially upright portion like that shown at 8 in these figures if the seat back is to be constructed in accordance with the principles of the invention.

Figure 1:
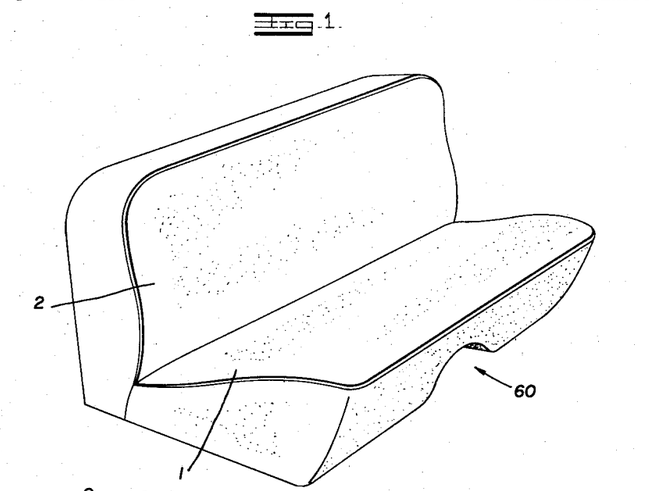
Figure 1 is a front perspective view of a completely upholstered seat unit of automotive type embodying the invention.
Figures 2, 3:
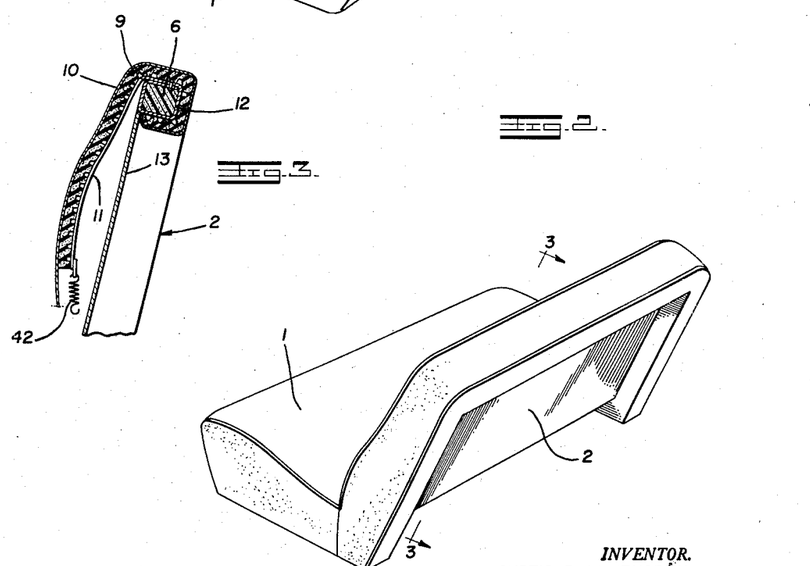
Fig. 2 is a rear perspective view of the same.
Fig. 3 is a vertical sectional view taken on the line 3—3 of Fig. 2 showing one form of back construction that may be used with a bottom construction embodying the invention.

As shown in Figs. 1–3 the seat is finished in padded and upholstered condition, having for example a sheet of cored foam rubber 9 faced with suitable upholstery sheet material 10 covering the back and bottom.

Figures 4, 5:
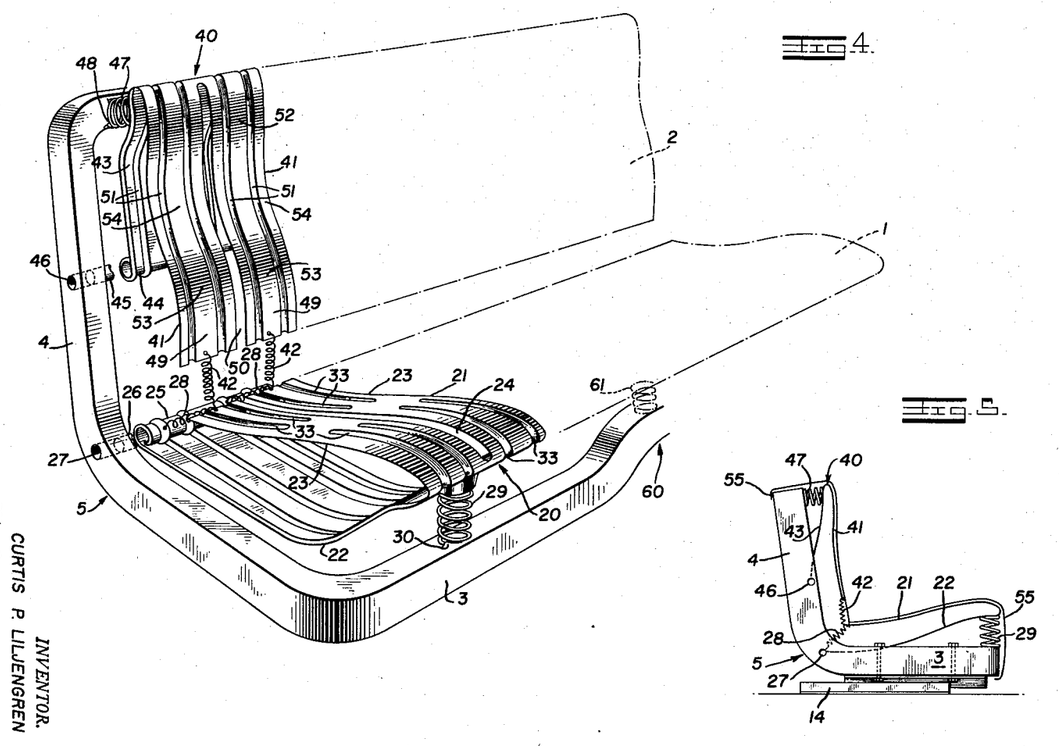
Fig. 4 is a front perspective view, partly stripped and partly exploded, of the preferred back and bottom constructions embodied in Figs. 1 and 2.
Fig. 5 is an end elevational view of the construction shown in Fig. 4.

Fig. 4 shows a preferred form of the internal construction of the back and bottom cushions comprising a complete embodiment of the invention. If a seat is to be made with the present invention incorporated only in the bottom cushion, the back cushion structure may be made as shown in Fig. 3, as disclosed in Patent No. 2,833,339, where the back cushion member 11 and supporting beam 12 may be made from a single sheet of metal slotted and preformed as disclosed in said application. If desired a trim panel of plywood or other sheet material 13 may be used to close the back opening.

In any of the several embodiments the seat support may be mounted on any more or less conventional track as shown at 14 in Fig. 5 for fore and aft adjustment as is common in automotive usage.

Referring now particularly to Fig. 4, showing a full embodiment of the invention incorporated in both the back and bottom, each of these units comprises an assembly of strip means having their inner ends, i.e., the rear ends of the bottom strip elements and the lower ends of the back strip elements, spring connected to the support, and having their opposite ends, i.e., the front ends of the bottom strip elements and the upper ends of the back strip elements, resiliently connected to the support for movement in a direction generally normal to the overall plane of the strip element, i.e., up and down for the bottom strip elements and in and out for the back elements, and each of the strip elements has its last named end connected to the support by means preventing lengthwise movement of the element. As shown in Fig. 4, this arrangement is achieved in the following manner:

The seat bottom cushion unit in Fig. 4 is made up of a plurality of spring means or elements each designated 20 in its entirety and each comprising an outer or upper portion 21 and an inner or lower portion 22. These elements are arranged side by side across the entire width of the seat bottom unit. For clarity of illustration only one element is shown in Fig. 4. In the form there depicted the upper portion 21 consists of two halves 23, 23, separated by a slot 24 which is open to the rear end and extends to the front edge. At the front edge the strip is return bent as a single, unslotted width to form the lower portion 22. This lower portion is directed rearwardly in spaced relation beneath the upper portion, and terminates in a rolled end 25 or other formation appropriate for making connection to the support. In the present instance a tube 26 extends through all the aligned rolled ends 25 and has its end portions mounted in the support 5 as shown at 27.

The rear ends of the upper portions 21 of the strip means are connected to the rolled ends 25, and hence to the support 5 through the medium of the inner tube 26, by coiled tension springs 28.

Figures 6, 7, 9:
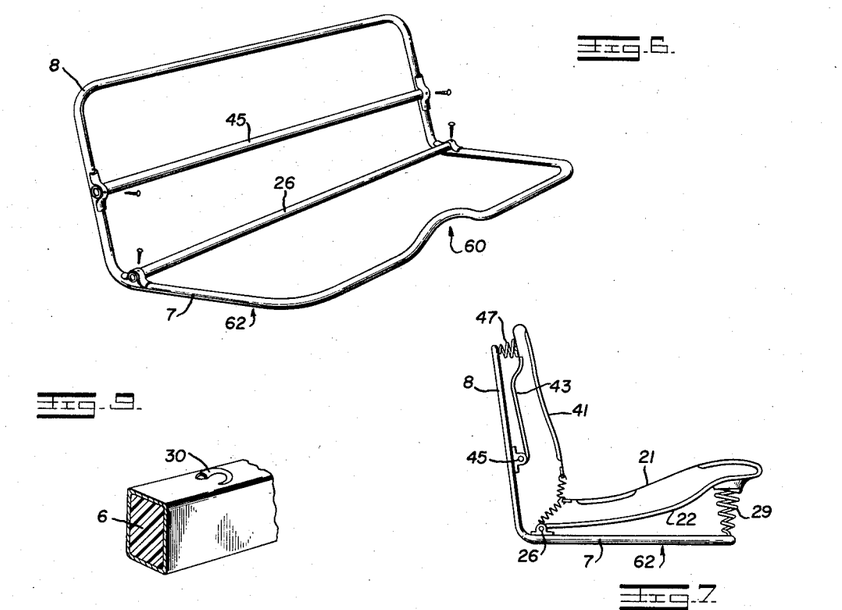
Fig. 6 is a front perspective view of a modified form of framing structure.
Fig. 7 is an end elevational view of an assembly of framing structure as shown in Fig. 6 and back and bottom cushion elements.
Fig. 9 is a perspective detail view taken on the line 9—9 of Fig. 8.
Figure 8:
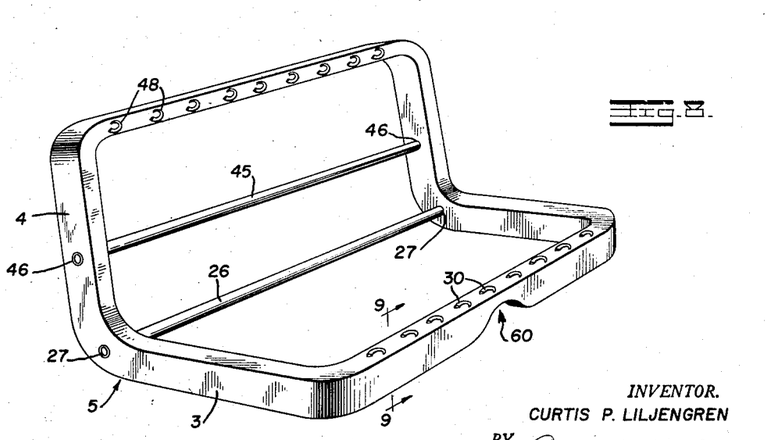
Fig. 8 is a front perspective view of the framing structure shown in Fig. 4.

The front end of the lower portion 22 of each strip means 20 is perforated and deformed to provide an anchorage for a supporting coiled compression spring 29 which has its other end similarly secured in the front portion of the support, as shown at 30 in Figs. 4, 8 and 9.

Figure 14:
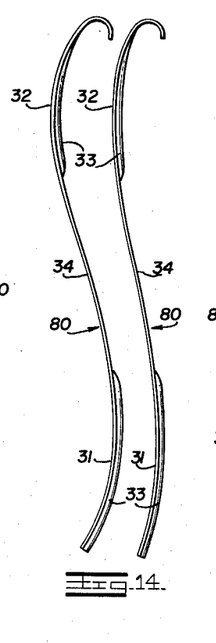
Fig. 14 is a view in side elevation of a pair of strips forming the top portions of the assemblies shown in Figs. 11 and 12.
Figure 15:
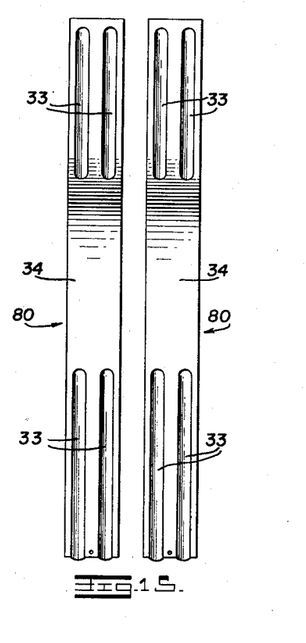
Fig. 15 is a top plan view of the strips shown in Fig. 14.

Each individual half 23 of the upper portion 21 of each strip means 20 is similarly contoured to provide a body-conforming surface of the shape shown, with reference to another embodiment of the strip means, in Figs. 14 and 15, so as to be of generally very flat S-shape in side elevation. That is to say, each of these portions is formed with an upper surface having a shallow concavity 31 in its rear area and a low convexity 32 in its front area.

Both of these areas are rigidified by longitudinal beads 33. The intervening zone 34, left unbeaded, is relatively flexible.

The strip means 40 forming the back assembly are similarly arranged side by side and mounted on the support 5. Each of these strip means includes an outer or forward portion 41 having at its lower end a hole or other formation for anchoring a coil tension spring 42 which has its other end connected to the adjacent seat bottom forming strip 20. The connections may be made by threading the ends of the springs 42 through the same holes in the halves 23 that receive the ends of the springs 28. Thus the lower ends of the portions 41 of the back-forming strip means 40 are operatively spring connected to the support 5.

The upper ends of the strip means 40 are return bent to provide inner portions 43, in much the same manner as the lower portions 22 of the strip means 20, and are similarly provided at their free ends with rolled terminals 44 through which a tube 45 passes with its ends mounted in the upright portion 4 of the support 5 as shown at 46. In the present instance the return bent inner portions 43 are shortened to lengths substantially less than that of the portions 41.

The upper ends of the strip means 40 are perforated and deformed to provide an anchorage for a supporting coiled compression spring 47 which has its other end similarly secured in the upper portion 4 of the support 5 as shown at 48 in Figs. 4 and 8.

The strip means 40, in the form shown in Fig. 4, are divided to provide side by side identical twin halves 49 in the front portions 41 by a lengthwise slot 50, and the return bent rear portion of each pair of halves is undivided, in a manner similar to the arrangement described for the seat bottom strip means 20.

Each of the strip means 40 is beaded throughout its length, as shown at 51, and is maintained by the beads in the shape shown in Fig. 4, so as to have a front surface which is convex at its upper and lower zones 52 and 53, respectively and concave in its intermediate zone 54. This is for the purpose of conforming substantially to the body shape of an occupant.

To complete the cushion units, a sheet of burlap or the like 55, Fig. 5, is loosely draped over and cemented to the strip means of both units with enough slack at the juncture of the units to permit freedom of movement of the springs 28 and 42. The upper margin of the burlap sheet, and the forward margin thereof, are turned over the frame portions 4 and 3 respectively and cemented thereto, slightly loading the springs 47 and 29, if desired, so as to hold them uniformly leveled when the seat is unoccupied. Attachment of the foam rubber and upholstery sheets, as shown in Fig. 3, completes the cushions.

Figures 20, 21, 22, 23:
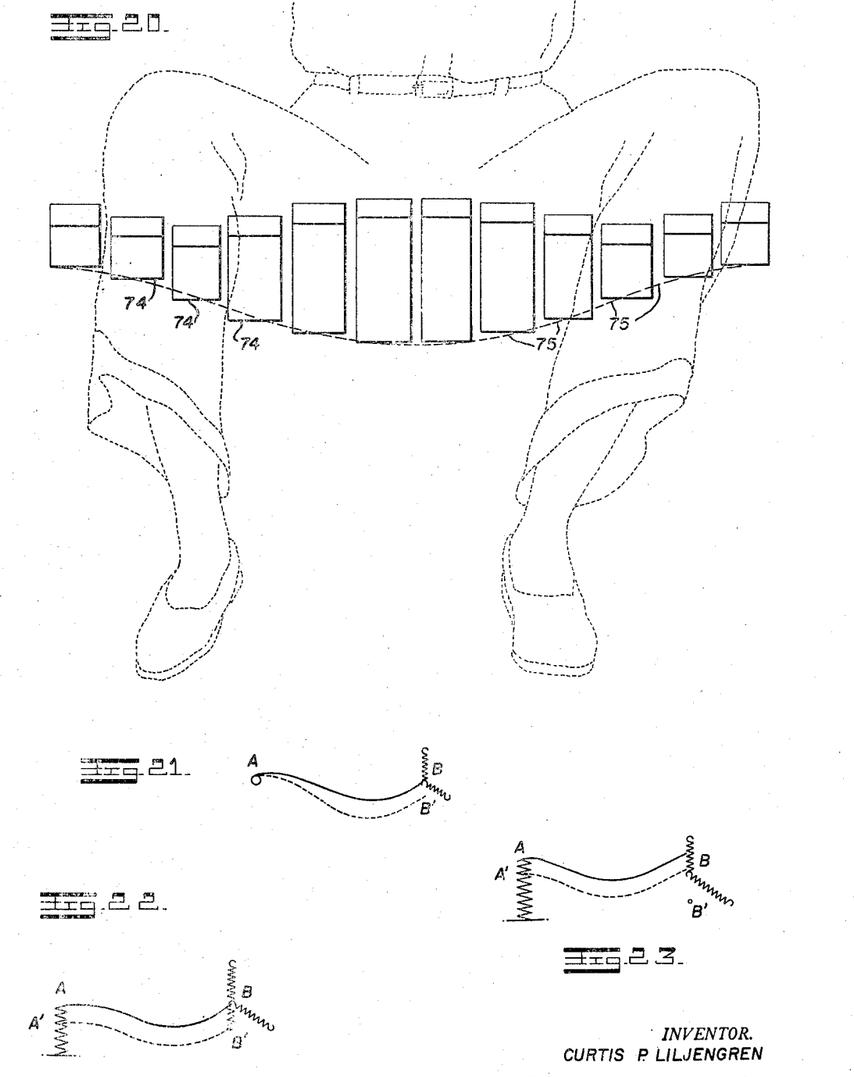
Fig. 20 is a front view of an untrimmed and hence incomplete assembly of seat bottom cushion elements illustrating the conformability of the assembly to an occupant.
Figs. 21, 22 and 23 are diagrammatic views illustrating the reaction of the structure under various load conditions.

The spring cushion units embodying the invention may be regarded as incorporating body-supporting surfaces of a "flexible contour" type. When unoccupied, the preformed contour of the back and bottom strip means conforms to the "average" crosswise contour of the so-called "standard" anthropomorphic figure, thus approximating as closely as possible the contour that most prospective occupants would find most comfortable. When the cushion units are occupied, however, the individual spring suspension of each strip means at the back-bottom juncture, plus the yielding support at the front edge of the bottom cushion and at the top edge of the back cushion, permits the strip means to conform closely to the figure of the occupant, almost without regard to his posture. This is best illustrated by Fig. 20. The superior comfort results from the fact that a very large area of the supporting surface of the seat back or bottom is in supporting contact with the figure. Any area of the occupant's body tending to create a higher pressure than its surrounding area will cause the spring-mounted strip means to drop away at that point until the pressure at the point becomes equal all over the area. Thus the pressure will become equalized over the entire area of contact. Since the precontour is designed to best fit the "standard" anthropomorphic figure as determined by numerous medical measurements, the greatest percentage of adult humans will automatically fit the precontour. The light pressures necessary to readjust the contour permit automatic readjustment of contour so that the occupant has maximum body contact area with the cushion. Obviously, the greater area over which an individual's weight is distributed the less will be the local pressures and the greater the comfort. This type of precontour encourages the occupant to assume his best sitting posture, thus reducing fatigue and the tendency to want to change sitting positions frequently.

In addition to the foregoing advantages, the suspension is especially well suited for use in automobiles since road shocks of the full range of low frequency to high frequency vibration, as well as shock loads of considerable magnitude, are absorbed or damped with practically no transmission to the occupant. Even slight deflections transmitted to the occupant under the severest road shocks are completely damped and non-repeating.

An important feature of the new construction is the spring mounting arrangement at the free end (front of the seat bottom and top of the seat back) of each cushion unit, particularly when combined with the means for restraining longitudinal movement of the free end. In vehicle seats particularly, freedom for longitudinal movement and for lateral movement is undesirable. Lateral movement tends to occur on "cornering" and is obviously objectionable, and longitudinal movement would alter the contour by varying the magnitude of the curvature from the pre-set ideal, thus impairing the comfort of the unit. It is important to preserve this contour. Every cushion construction has a certain range of deflection between unoccupied and occupied conditions under a given load. For maximum comfort this range must be controlled because the cushion is comfortable only within a certain portion of the range. In any cushion utilizing a flexible but inextensible body-supporting member, any small change in lengthwise spacing between end bearing points results in a relatively large change in depth and height of contour. This is of course true also of the strip material used in the present construction. In the use of such materials it is necessary to make at least one of the two end points movable to permit the cushion to yield on impact. In the present invention the body-supporting material, e.g., the strip means top portions 21, is flexible and inextensible to permit the "bucket" of the contour to move fore and aft with fore and aft movements of the occupant, so that the contour will always conform to the occupant's requirements and provide him with good comfortable support whether he sit erect or slouch forward. Now it is important that this contour be maintained substantially unchanged on changes in the load, i.e., on impact, as when the occupant moves up and down responsive to road shocks. The present construction provides for this maintenance of contour, in for example the seat bottom unit, by mounting the front end for up and down movement while restrained against fore and aft movement and by connecting the rear end to the support by spring means permitting, in addition to the up and down movement, the fore and aft movement required to prevent the flattening of the contour or the deepening of the contour that would otherwise result from the fact that the front end cannot move back or forward.

The similar mountings of the back cushion unit, being similarly arranged, are operative in an analogous manner, as will be understood.

The foregoing characteristics of the suspension are illustrated by Figs. 21, 22 and 23.

Fig. 21 illustrates the action of a seat bottom unit, under loads of different weight (whether of different occupants or of the same occupant under shock loads), of a construction made in accordance with the present invention except for the front end suspension A, which is here shown fixed against vertical movement. Assuming that the ideal contour is that shown in full lines A—B, it will be noted that the contour changes considerably to the broken line A—B' on the imposition of a heavier load. Such a construction is not equally comfortable to occupants of different weight, or to the same occupant under shock load.

Fig. 22 shows the action of the present construction. Assuming that the line A—B is that of the ideal contour under light load for a given occupant in a given position, it will be noted that the imposition of heavier load simply moves the line to the position A'—B' without change of contour. Thus the ideal supporting shape remains constant as long as the occupant retains the same posture regardless of load changes. If however the occupant change his posture as for example by slouching forward, the ideal contour becomes that shown by the line A—B in Fig. 23, the flexibility of the strip material readily permitting the assumption of the new shape. The imposition of any greater load now moves the line to the position A'—B' in this figure, which is merely lower, the contour remaining unchanged.

In addition to the foregoing advantages, the present construction provides the comfort of a soft front edge for the seat bottom unit and a soft top edge for the seat back unit.

The basic principles thus far shown incorporated in one type of construction may be embodied in other forms, and various changes may be made in much of the structure. For example, the front portion 3 of the supporting frame 5 may be provided with a tunnel 60 as shown in Figs. 1, 4 and 8, in any embodiment of the invention for automotive use where a particularly high drive shaft housing is encountered. Shortened springs 61 will be used in such a location.

Figures 16, 17:
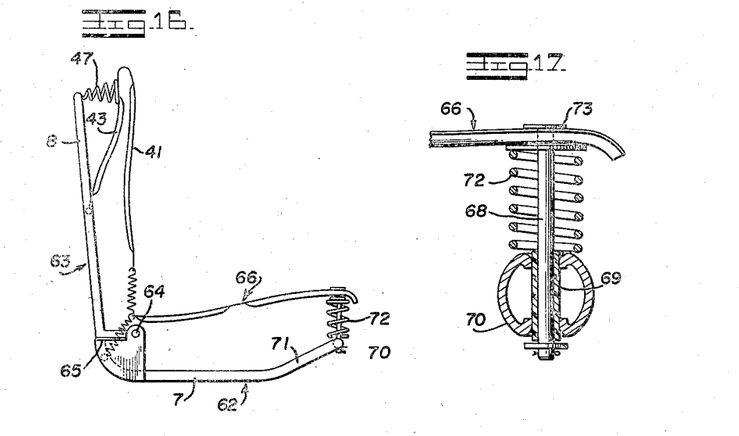
Fig. 16 is a side elevational view of folding back type of seat embodying the invention.
Fig. 17 is a vertical cross sectional detail view of the front portion of the construction shown in Fig. 16 showing a form of outer edge support for the strips of Figs. 14 and 15.

Figs. 6, 7 and 16 show a modified type of support, comprising a frame 62 fabricated from small diameter unfilled metal tubing.

Fig. 16 shows a construction in which the backrest 63 is made foldable about a hinge 64 against a stop 65 which may be made of formed sheet metal carried by the bottom portion 7 of the support frame.

Figure 18:
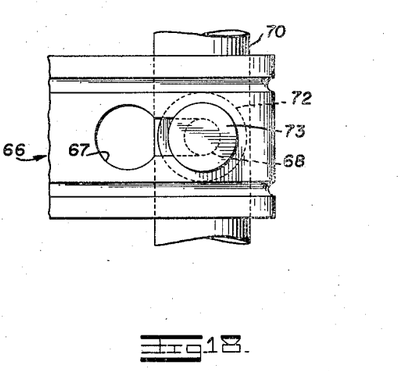
Fig. 18 is a top plan view of the construction shown in Fig. 17.

A further difference between the construction shown in Fig. 16 and those previously described is in the alternate type of front mounting, which is shown in detail in Figs. 17 and 18. Strips 66, generally like those shown in Figs. 14 and 15, have keyhole slots 67 at their front ends each engaged with a pin 68 standing through a nylon bushing 69 set in the front framing member 70 of the support. The member is bent up, as shown at 71 in Fig. 16, to permit the pin 68 to descend upon compression of the spring 72. The pin is preferably formed with two heads 73, 73, holding the front end of the strip 66 with sufficient clearance to permit limited twisting of the strip to prevent the condition shown in full lines 74 in Fig. 20, where it will be noted the crosswise contour is defined by an interrupted line composed of a series of offsets. With freedom for twisting, this offset or interrupted line is transformed into a continuous and uninterrupted line 75, thus even further smoothing out the contour by removing small variations and enhancing the comfort of the seat.

Figure 19:
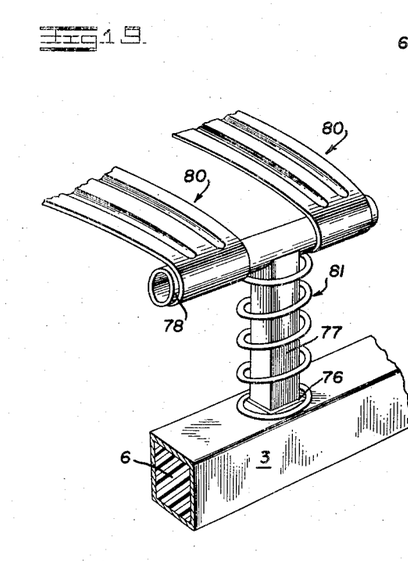
Fig. 19 is a detail perspective view of a modified form of outer edge support for the strips shown in Figs. 14 and 15.

Fig. 19 shows a construction in which a nylon sleeve 76 is mounted in the front member 3 of the support to serve as a slide bearing for a post 77 having a T-head 78 around which the ends of the strips 80 shown in Figs. 14 and 15 are rolled. A compression spring 81 provides a resilient, yieldable support, just as the springs 72 in Fig. 17. The polygonal cross section of the post prevents twisting, and the slide bearing 76, like the bearing 69, prevents longitudinal movement of the strip means, thus performing a function similar to that of the portion 22 in Fig. 4.

Figure 11:
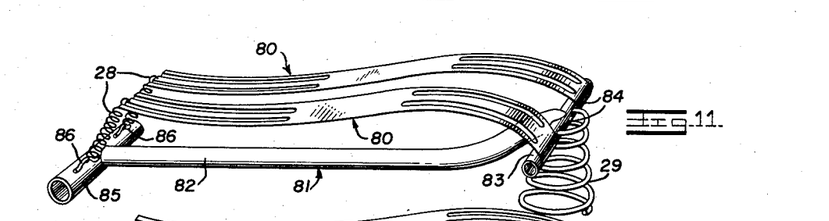
Fig. 11 is a perspective view of a modified form of seat bottom cushion element assembly.
Figure 12:
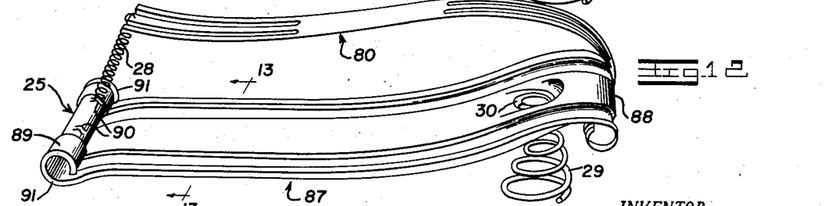
Fig. 12 is a similar view of a further modified form of seat bottom cushion element assembly.

Figs. 11 and 12 show modified forms of strip means. These constructions utilize strips 80 as shown in Figs. 14 and 15 (one being omitted for clarity of illustration in Fig. 12). In Fig. 11 longitudinal movement of the front end of the strip is prevented by the compression member 81 consisting of three lengths of small diameter metal tubing welded into double ended T-shape as shown to provide a longitudinal portion 82, a front end head 83 having a pair of holes 84 through which the end turn of the spring 29 is threaded, and a rear end head 85 for receiving the tube 26. The rear end head 85 is provided with clips 86 for holding the springs 28.

Figure 13:
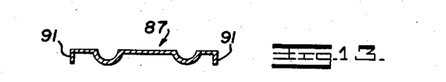
Fig. 13 is a cross sectional view taken on the line 13—13 of Fig. 12.

In Fig. 12, longitudinal movement of the front end of the strip is prevented by the compression member 87 which is made of formed sheet metal, a preferred type of cross section of which is shown in Fig. 13. Both ends are rolled, the forward end 88 to receive the strip 80, and the rear end 89 to receive the tube 26. Hooks 90 are formed on the rear ends for attachment of the springs 28. Stiffening edge flanges 91 extend throughout the length of the member 87, including the rear rolled end where they provide flat bearing surfaces for adjacent members.

Figure 10:
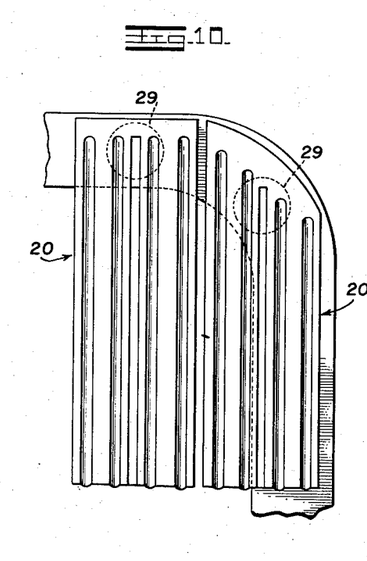
Fig. 10 is a top plan view of a front corner of an assembly of seat bottom cushion elements, or the figure may be regarded as a front elevational view of a top corner of an assembly of seat back cushion elements, in either case the arrangement being that shown in Fig. 4.

Fig. 10 illustrates an advantage of the Fig. 4 type of strip means over those shown in Figs. 11 and 12. As there shown, the endmost strip means may be formed with a rounded outer end to form a curved corner for the cushion.

I claim:

1. A seat construction comprising a support, a seat cushion unit comprising a plurality of strip means arranged in side by side assembly, each strip means having an outer portion providing an occupant-supporting surface, said strip means being arranged with the ends of said outer portions of all of them at one edge of the assembly disposed in substantially continuous laterally directed alignment, means resiliently connecting said end of each outer portion to the support, the opposite ends of the outer portions being mutually independently spring connected to the support with restraint against lengthwise and lateral movement and freedom for movement substantially normal to the general plane of said occupant-supporting surface of the assembly.

2. A seat construction as claimed in claim 1 in which the support includes a substantially upright portion with the cushion unit forming a seat back element connected to the front of said upright portion and disposed in a substantially vertical general plane with the second named ends of the outer portions of the strip means forming the upper edge of the seat back element and connected to the upper zone of said upright portion of the support.

3. A seat construction as claimed in claim 1 in which the support includes a substantially horizontal portion with the cushion unit forming a seat bottom element connected to the upper surface of said horizontal portion and disposed in a substantially horizontal general plane with the second named ends of the outer portions of the strip means forming the front edge of the seat bottom element and connected to the front zone of said horizontal portion of the support.

4. A seat construction as claimed in claim 1, including elongated substantially inextensible means connecting the second named ends of the outer portions of the strip means with a portion of the support nearer the first named ends of the outer portions for restraining the strip means against lengthwise movement.

5. A seat construction as claimed in claim 1, in which elongated substantially inextensible extensions of the outer portions of the strip means are integrally connected at one end of each to the second named ends of the outer portions and are connected at their opposite ends to a portion of the support nearer the first named ends of the outer portions for restraining the strip means against lengthwise movement.

6. A seat construction as claimed in claim 1, including a plurality of elongated substantially inextensible elements each underlying one of the outer portions of the strip means and having one end separably connected to the second named end of the outer portion of a strip means and having its opposite end separably connected to a portion of the support nearer the first named end of said outer portion for restraining the strip means against lengthwise movement.

7. A seat construction as claimed in claim 1, in which the second named ends of the outer portions of the strip means are connected to the support by coil compression springs.

8. A seat construction as claimed in claim 1, in which the support includes substantially upright and substantially horizontal portions with a cushion unit forming a seat back element connected to the front of the upright portion and a cushion unit forming a seat bottom element connected to the upper surface of the horizontal portion.

9. A seat construction as claimed in claim 1, in which the support includes substantially upright and substantially horizontal portions with a cushion unit forming a seat back element connected to the front of the upright portion and a cushion unit forming a seat bottom element connected to the upper surface of the horizontal portion, and including spring means connecting the first named end of each seat bottom strip means to the support adjacent the juncture of the upright and horizontal portions and including also spring means connecting the first named end of each seat back strip means to said first named spring means.

10. A seat construction as claimed in claim 1 in which the second named end of the outer portion of each strip means is connected to the support with limited freedom for lateral twisting upon the imposition of laterally unbalanced loads.

11. A seat construction as claimed in claim 1 in which the second named end of the outer portion of each strip means is connected to the support with clearance in a direction substantially normal to the general plane of the occupant-supporting surface of the assembly to provide for lateral twisting upon the imposition of laterally unbalanced loads.

12. A seat construction as claimed in claim 1 in which the second named end of the outer portion of each strip means is separably connected to the support, said connection comprising a pin upstanding from the support and extending through an opening in the strip means.

13. A seat cushion element comprising a resilient strip of metal having an outer portion preformed to body-conforming contour having its rear end formed for connection to a support in a seat and having its front end return bent to provide an inner portion directed rearwardly beneath the outer portion and terminating in a formation adapted to be connected to a point on said support spaced from the first named end of the strip, the entire length of the inner portion between the return bent end and the terminal formation being spaced below and out of contact with the outer portion.

14. A seat cushion element as claimed in claim 13 in which the return bent portion of the strip is shorter than the outer portion thereof.

15. A seat cushion element as claimed in claim 13 in which the intermediate zone of the outer portion of the strip is more flexible than the endmost zones of said portion.

16. A seat construction comprising a cushion member having a resilient body-supporting surface preformed to body-conforming contour of inextensible, flexible material, means resiliently suspending said cushion member for movement, resulting from variations in load, in a direction substantially normal to the general plane of said surface with retention of said body-conforming contour, said suspension comprising means resiliently mounting one end of the member for movement in said normal direction while preventing movement in all other directions, and comprising also means resiliently mounting the other end of the member for movement in any direction.

17. A seat cushion element comprising a resilient strip of metal having an outer portion preformed to body-conforming contour having its rear end formed for connection to a support in a seat and having its front end return bent to provide an inner portion directed rearwardly beneath the outer portion and terminating in a formation adapted to be connected to a point on said support spaced from the first named end of the strip, the outer portion of the strip being of substantially uniform flexibility throughout its length.

18. The element claimed in claim 17, including a bead extending the full length of the element for maintaining it in said pre-formed contour.

References Cited in the file of this patent

UNITED STATES PATENTS

| | | |
|---|---|---|
| 1,513,726 | Lamplugh | Oct. 28, 1924 |
| 1,814,789 | Dorton | July 14, 1931 |
| 2,586,433 | Lepp et al. | Feb. 19, 1952 |
| 2,722,267 | Liljengren | Nov. 1, 1955 |
| 2,817,390 | Crites | Dec. 24, 1957 |

FOREIGN PATENTS

| | | |
|---|---|---|
| 466,999 | Great Britain | June 9, 1937 |
| 643,005 | France | Sept. 8, 1928 |